United States Patent
Wong et al.

(10) Patent No.: US 8,854,389 B2
(45) Date of Patent: Oct. 7, 2014

(54) APPARATUS AND METHOD FOR HARDWARE-BASED VIDEO/IMAGE POST-PROCESSING

(75) Inventors: Samuel Wong, Richmond Hill (CA); Sreenath Kurupati, Santa Clara, CA (US); Brian R. Nickerson, Hillsboro, OR (US); Sunil Chaudhari, Milipitus, CA (US); Jonathan W. Liu, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 1978 days.

(21) Appl. No.: 10/947,821

(22) Filed: Sep. 22, 2004

(65) Prior Publication Data

US 2006/0062489 A1    Mar. 23, 2006

(51) Int. Cl.
  *G06F 12/00*   (2006.01)
  *G06T 3/40*    (2006.01)
(52) U.S. Cl.
  CPC .................... *G06T 3/4007* (2013.01)
  USPC ........................................ 345/564; 345/660
(58) Field of Classification Search
  USPC ......................................... 382/298, 100, 284
  See application file for complete search history.

(56) References Cited

U.S. PATENT DOCUMENTS

| | | | |
|---|---|---|---|
| 5,237,432 A | 8/1993 | Calarco et al. | |
| 5,351,085 A | 9/1994 | Coelho et al. | |
| 5,384,582 A | 1/1995 | Keith et al. | |
| 5,386,232 A | 1/1995 | Golin et al. | |
| 5,408,627 A * | 4/1995 | Stirk et al. | 711/151 |
| 5,432,554 A | 7/1995 | Nickerson et al. | |
| 5,488,568 A | 1/1996 | Keith et al. | |
| 5,493,514 A | 2/1996 | Keith et al. | |
| 5,528,238 A | 6/1996 | Nickerson | |
| 5,528,704 A | 6/1996 | Parker et al. | |
| 5,539,662 A | 7/1996 | Nickerson | |
| 5,559,722 A | 9/1996 | Nickerson | |
| 5,638,068 A | 6/1997 | Nickerson | |
| 5,650,858 A | 7/1997 | Lund | |
| 5,657,402 A * | 8/1997 | Bender et al. | 382/284 |
| 5,689,343 A | 11/1997 | Loce et al. | |
| 5,764,787 A | 6/1998 | Nickerson | |
| 5,778,097 A | 7/1998 | Nickerson | |
| 5,829,026 A * | 10/1998 | Leung et al. | 711/122 |
| 5,864,345 A | 1/1999 | Wickstrom et al. | |
| 5,900,861 A | 5/1999 | Nickerson et al. | |
| 5,926,222 A | 7/1999 | Nickerson | |
| 5,926,569 A | 7/1999 | Nickerson | |

(Continued)

FOREIGN PATENT DOCUMENTS

WO    WO 99/18727    4/1999

*Primary Examiner* — Phi Hoang
(74) *Attorney, Agent, or Firm* — Blakely, Sokoloff, Taylor & Zafman LLP (57) ABSTRACT

A method and apparatus for hardware-based anamorphic video scaling. In one embodiment, the method includes the fetch of zero or more new input pixels according to an entry of an input control memory corresponding to a current output pixel. Once fetched, the zero or more new input pixels replace at least one stored input pixel of N, input pixels. Using the updated N, input pixels and an N, coefficient set selected according to an entry of a coefficient memory corresponding to the current output pixel, a pixel computation, such as, for example, an anamorphic scaling computation, is performed. In one embodiment, the anamorphic scaling is performed by subdividing an X×Y pixel frame into X/M M×Y pixel subframes. Other embodiments are described and claimed.

20 Claims, 8 Drawing Sheets

(56) References Cited

U.S. PATENT DOCUMENTS

| | | | |
|---|---|---|---|
| 6,005,580 A | 12/1999 | Donovan | |
| 6,144,700 A | 11/2000 | Kim | |
| 6,310,659 B1* | 10/2001 | Glen | 348/589 |
| 6,393,134 B1* | 5/2002 | Tostevin et al. | 382/100 |
| 6,404,812 B1 | 6/2002 | Martins et al. | |
| 6,549,674 B1 | 4/2003 | Chui et al. | |
| 6,664,955 B1 | 12/2003 | Deering | |
| 6,793,312 B2* | 9/2004 | Ohde | 347/19 |
| 6,801,143 B2 | 10/2004 | Oberai et al. | |
| 6,842,190 B1 | 1/2005 | Lord et al. | |
| 6,925,464 B2 | 8/2005 | Kurupati | |
| 2002/0057362 A1* | 5/2002 | Wredenhagen et al. | 348/441 |
| 2004/0022318 A1* | 2/2004 | Garrido et al. | 375/240.11 |
| 2005/0141784 A1* | 6/2005 | Ferriz | 382/298 |

* cited by examiner

APPARATUS AND METHOD FOR HARDWARE-BASED VIDEO/IMAGE POST-PROCESSING

BACKGROUND

One or more embodiments relate generally to the fields of image enhancement and video post-processing. More particularly, one or more of the embodiments of the invention relates to a method and apparatus for hardware-based video/image post-processing.

One-dimensional video scaling provides a technique for either increasing or decreasing the number of pixels in a frame. For example, upscaling may increase the number of pixels in a frame, whereas downscaling may decrease the number of pixels in a frame. Upscaling may be used to enable display of a 16:9 widescreen format to, for example, a 4:3 standard television format. In other words, to fit the widescreen format onto the taller 4:3 format of a television, "vertical" upscaling may be performed to stretch the widescreen format in a vertical direction to occupy the entire television screen. Likewise, "horizontal" scaling may be used to stretch a television format in a horizontal direction to occupy a widescreen television.

One problem with upscaling is that the resulting picture shown on the television screen may be flawed since the items on the screen are stretched, or upscaled, in one direction and not correspondingly scaled in another direction. To avoid the flaws of purely one-dimensional scaling, another technique for performing scaling is referred to as anamorphic scaling. In addition to processing in two dimensions, anamorphic scaling generally requires an non-integral scaling factor. One technique for implementing anamorphic scaling is the use of hardware-based polyphase filters. For example, upscaling may be used to fit a 1280×720 pixel input onto a 1920×1080 output screen. In this example, the image is upscaled vertically and horizontally by the same factor i.e., 1.5 times. However, in some cases the image might need to be upscaled by a different amount vertically and horizontally. For example, to enable viewing widescreen (16:9) input onto a 4:3 TV, the image might need to be stretched vertically to fit the taller 4:3 format of the TV. Likewise, extra horizontal stretching might be required when trying to show 4:3 content on a 16:9 TV.

One problem with scaling the image differently vertically and horizontally, is that the resulting picture shown on the television screen may be flawed since the items on the screen are stretched, or upscaled, more in one direction and scaled less (or not at all) in another direction. To avoid the flaw, a different scaling algorithm is used which is anamorphic scaling. Anamorphic scaling is still 1-D scaling, however different portions of the screen are scaled by different amounts. As an example, to fit 4:3 content onto a 16:9 content, instead of stretching the picture horizontally by the same amount everywhere, the center of the screen is not stretched (so that objects in the center look natural), and the picture edges are stretched more (to fill the screen).

Typically, 1-D image scaling is done using polyphase filters. Unfortunately, implementing anamorphic scaling in hardware-based polyphase filters is typically a very costly process because the scaling factor does not remain constant. Generally, high-end polyphase filters often have up to 64 different coefficient sets comprised of multiple coefficient values. In a worst case scenario, anamorphic scaling requires a different scaling factor for every pixel. In addition, each different scaling factor requires a different coefficient set to compute the output pixel. Hence, a unique coefficient set may be required to compute each output pixel. In other words, to scale a row of 1920 pixels (high-definition (HD) content), 1920 different coefficient sets (for the worst case scenario) are required. Consequently, the 64 different coefficient sets provided by a high-end polyphase filter are generally inadequate for performing scaling of HD content.

BRIEF DESCRIPTION OF THE DRAWINGS

The various embodiments of the present invention are illustrated by way of example, and not by way of limitation, in the figures of the accompanying drawings and in which.

DETAILED DESCRIPTION

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

System

Figure 1:
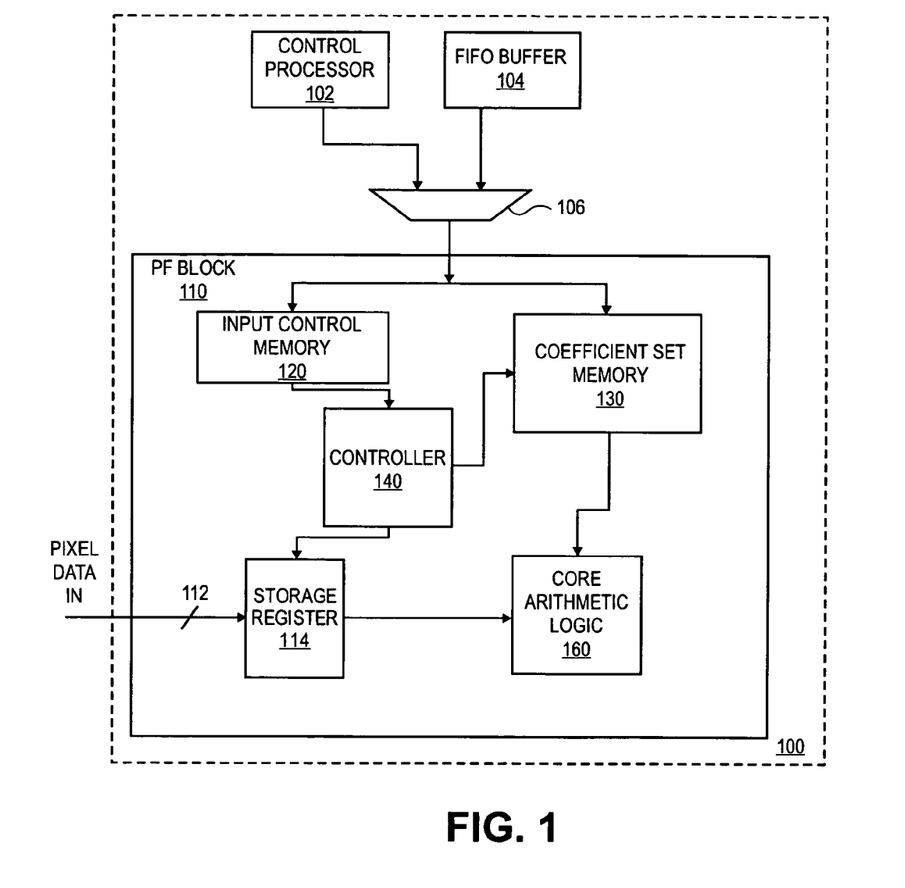
FIG. 1 is a block diagram illustrating a system including a hardware-based anamorphic scaling block, in accordance with one embodiment.

FIG. 1 is a block diagram illustrating a computer system 100, including a polyphase filter (PF) block 110 to provide hardware-based image/video post-processing and image enhancement, in accordance with one embodiment. In one embodiment, PF block 110 provides video post-processing in the form of horizontal anamorphic video scaling in a digital television (DTV) display processing pipeline. Generally scaling can be viewed as an interpolation/decimation process, which involves producing a larger/smaller (depending on the scaling factor) number of output pixels for a set of input pixels. When scaling is implemented using a polyphase filter, each output pixel produced is a function of N, input pixels, where N is an integer representing a number of taps of the polyphase filter. Generally, the N, input pixels used are centered on the same position as the corresponding output pixel (assuming a symmetric PF).

In one embodiment, PF block 110 implements a finite impulse response (FIR) filter or convolution sum, according to the following equation:

$$\sum_{i=0}^{i<N} P[i] * C[i] \quad (1)$$

In one embodiment, core arithmetic logic 160 performs Equation (1) for every output pixel of a new frame to be computed from an old frame. In one embodiment, the output pixels are computed according to a horizontal scaling operation. Although FIG. 1 is described with reference to horizontal scaling, embodiments described herein may be used to perform various forms of video post-processing and image enhancement including vertical scaling and other like video/image processing technique. In such embodiments, horizontal and vertical scaling are performed separately on received pixel frames, which may be provided from first in, first out (FIFO) buffer 104 at, for example, 30 frames per second via gate 106.

In one embodiment, for every output pixel, core arithmetic logic 160 performs parallel multiplication of N, input pixels and N, coefficient values (one coefficient set) and sums the individual results to produce an output pixel. As indicated above, the integer N is based on a number of taps provided by PF block 110. In one embodiment, the number of taps provided by PF block 110 is twelve taps. As a result, for a twelve tap PF 110, twelve input pixels and twelve coefficient values are required for each output pixel computation.

Figure 2:
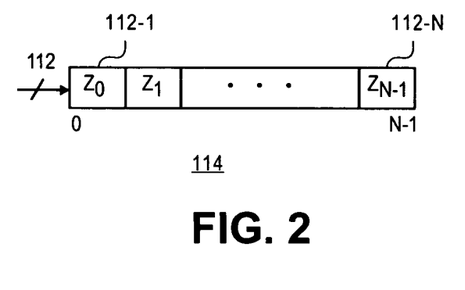
FIG. 2 is a block diagram further illustrating the N, entry storage register of FIG. 1, in accordance with one embodiment.

In one embodiment, the N, input pixels are stored in an N-entry storage register 114. In one embodiment, storage register 114 is comprised of N, registers coupled together to shift input pixels to adjacent registers. Representatively, for each output pixel computation, additional or new input pixels 112 may be required, which replace the oldest input pixels from the current set of N, input pixels. In one embodiment, storage register 114 is a shift register, as further illustrated in FIG. 2. As shown in FIG. 2, shift register 114 shifts in new input pixels 112, which causes oldest, or least recently used, pixels to be shifted out of storage register 150.

In one embodiment, controller 140 fetches new input pixels required for each output pixel computation. Generally, the number of input pixels to fetch for each output computation is dependent on the scaling factor. For example, if upscaling is being performed by a factor of two, controller 140 fetches two new input pixels each clock cycle. Conversely, if downscaling by a factor of two is performed, controller 140 fetches one new input pixel for every two output pixels computed.

However, when the scaling factor is non-integral, the number of pixels to fetch may potentially change from output pixel to output pixel, where the average rate of fetching is consistent with the scaling factor. Conventionally, tracking of the number of input pixels to fetch per output pixel computed is performed by hardware using a state machine, which is continually updated to determine an input pixel fetch count per cycle. However, in one embodiment, input control memory 120, as further illustrated in FIG. 3, is loaded by control software with input control values defining a pixel fetch counter per output pixel computation.

Figure 3:
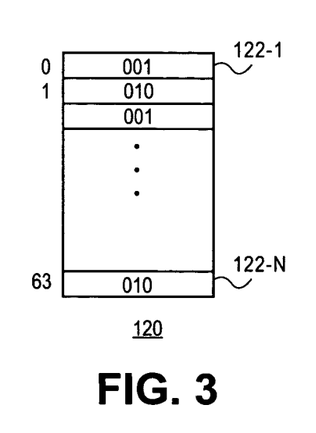
FIG. 3 is a block diagram further illustrating an input control memory of FIG. 1, in accordance with one embodiment.

As illustrated in FIG. 3, input control memory 120 includes 64 entries. Representatively, each entry 122 (122-1, . . . , 122-64) represents the number of pixels to fetch per output pixel computation. In one embodiment, control (embedded) processor 102 populates input control memory 120 to allow controller 140 to simply "walk through" (e.g., access in consecutive increasing linear order O, . . . , 63) input control memory 120 and fetch input pixels 112 according to the input control values 122 provided by input control memory 120. As a result, PF block 110 is simplified by avoiding a complex computation engine (piece of hardware) to determine a number of pixels to fetch per output pixel computation.

Figure 4:
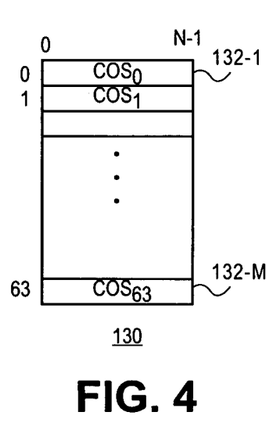
FIG. 4 is a block diagram further illustrating a coefficient set memory of FIG. 1, in accordance with one embodiment.

As indicated above, each output pixel computation may require, in addition to N, input pixels, N, coefficient values. These N, coefficient values represent a coefficient set (phase). In one embodiment, PF block 110 may store M, different coefficient sets (COS) 132 (132-1, . . . , 132-M) in coefficient set memory 130, as further illustrated in FIG. 4. Accordingly, for every output pixel computation, controller 140 fetches a coefficient set according to entries of coefficient memory 130. Generally, the particular set to fetch for a given output pixel is based on a computation, which involves keeping track of the current output pixel and the current scaling factor. Typically (for existing scalers), hardware performs this computation.

In one embodiment, controller 140 relies on control processor 102 or software pre-setup to determine the number of input pixels to fetch per output pixel and a coefficient set to select per output pixel computation. In one embodiment, control processor 102 is an embedded processor, which may be programmed with assembly language code. In an alternate embodiment, device drivers may be provided to either assist control processor 102 or to populate input control memory 120 and coefficient set memory 130 to enable linear access of respective memories 120 and 130 by controller 140 to provide operands to the core arithmetic logic 160 to perform, for example, an anamorphic scaling operation.

In one embodiment, control processor 102 populates coefficient set memory 130 and orders (writes) the COS 132 in a fashion so that controller 140 can access coefficient set memory 130 in a linear manner for every output pixel computation (i.e., $COS_0$ for output pixel zero, $COS_1$ for output pixel one, etc.). In one embodiment, control processor 102 populates input control memory 120 and coefficient set memory 130 to enable controller 140 to linearly access corresponding entries within input control memory 120 and coefficient set memory 130 to determine a pixel fetch count and a coefficient set per output pixel computation.

Hence, the scaling factor for anamorphic scaling can change, potentially requiring a different coefficient set for every output pixel in a 1920-wide high definition (HD) line. Likewise, the number of input pixels to fetch can be different for every output pixels such as, for example, a 1920-pixel wide HD line. In one embodiment, the size of input control memory 120 and coefficient set memory 130 are limited to M, entries (e.g., 64), which is less than the 1920-wide HD line by reading pixels from a pixel frame in a columnar/stride-based fashion, as illustrated in FIG. 5.

Figure 5:
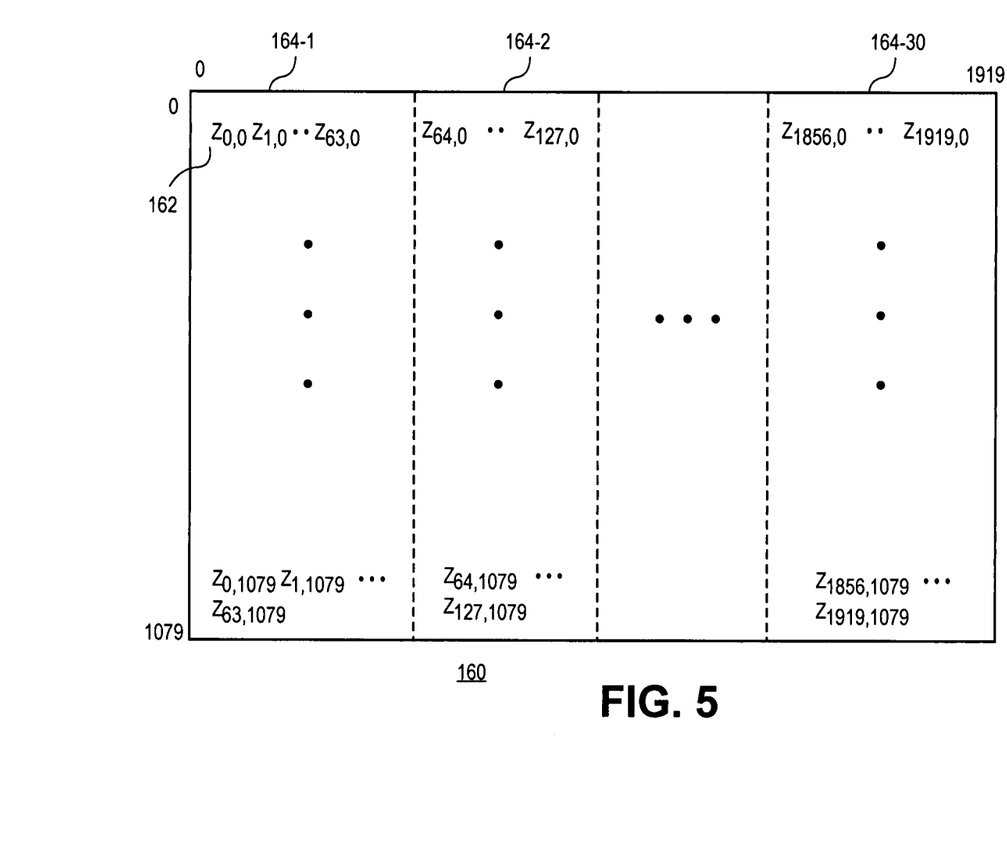
FIG. 5 is a block diagram illustrating subdivision of a frame buffer into a plurality of pixel subframes having an M, pixel column width, in accordance with one embodiment.

FIG. 5 is a block diagram illustrating a pixel frame 160, in accordance with one embodiment. In one embodiment, pixels are read in a columnar (stride) fashion, where a column width is restricted to M, pixels (in general, to the number of different coefficient sets provided). Representatively, instead of reading pixels in a raster scan order (left to right and top to bottom) and processing the pixels accordingly, in one embodiment, pixel frame 160 is broken-up into several M, pixel wide columns. For example, (1920×1080 HD) frame 160 is broken-up into thirty smaller (64×1080) subframes 164 (164-1, . . . , 164-30).

In one embodiment, each subframe 164 is processed in order. Representatively, pixels 162 in a given subframe 164 are read in a raster scan order, going from one line to the next within an M, pixel wide column (e.g., subframe 164-1). In one embodiment, restricting the column width to M, pixels enables limiting of input control memory 120 and coefficient set memory 130 to M, entries. In one embodiment, the integer M is based on a memory bus width, and is, for example, 64 bytes.

In one embodiment, at the end of processing of each subframe 164, reloading of input control memory 120 and coefficient set memory 130 is performed by control processor 102. In an alternate embodiment, the reloading of input control memory 120 and coefficient set memory 130 may be performed by controller 140 via direct memory access (DMA). In accordance with such an embodiment, device drivers may perform the initial subdivision of the pixel subframes (as shown in FIG. 5) and perform the necessary calculations regarding pixel fetch counts and coefficient sets assigned to each respective output pixel generated from each pixel subframe.

As illustrated in FIG. 5, input control memory 120 and coefficient set memory 130 contain an entry corresponding to each output pixel generated from the various input pixels 162 of a respective pixel subframe (e.g., 164-1). As will be recognized in the embodiment illustrated in FIG. 5, output pixels having a position falling within a same column may share a pixel fetch count and be assigned the same coefficient set. As a result, reloading of input control memory 120 and coefficient set memory 130 are not performed until each output pixel forming a pixel subframe 164 is computed. In one embodiment, PF block 110 may issue an interrupt to control processor 120 to indicate completion of output pixel computation for a current pixel subframe.

Figure 6:
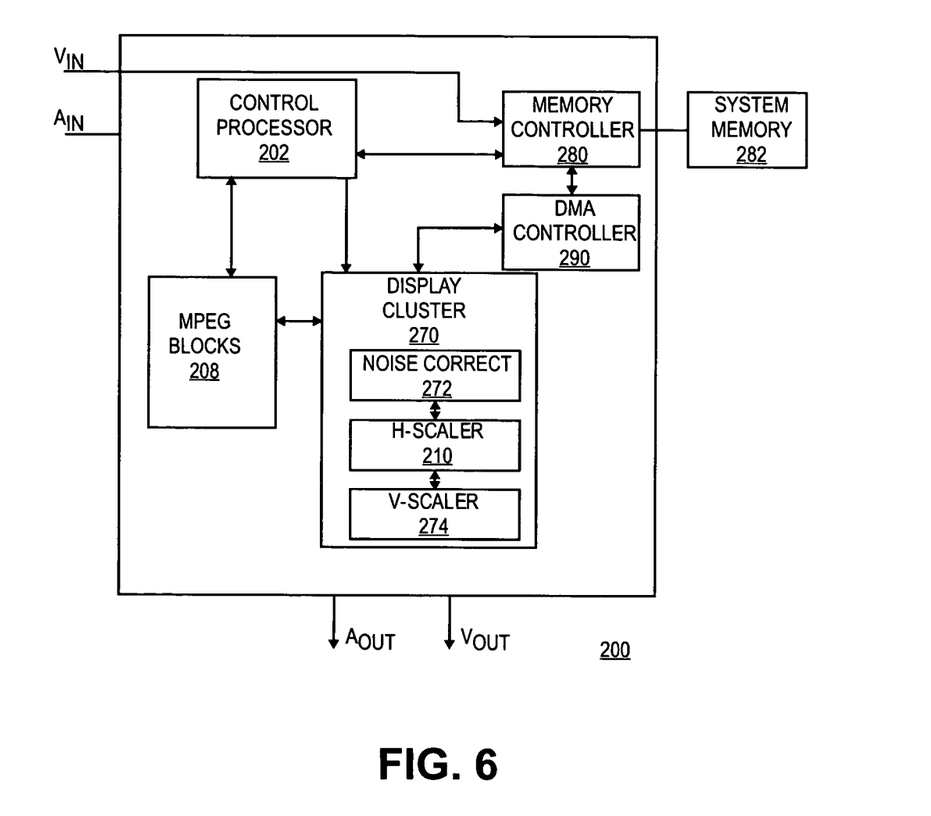
FIG. 6 is a block diagram illustrating an on-chip system, including a display cluster having an anamorphic video scaler, in accordance with one embodiment.

FIG. 6 is a block diagram illustrating a system on-chip (SOC) 200, including video-post processing logic (display cluster) 270 having a horizontal scaler (H-scaler) 210, including PF block 110 of FIG. 1, to provide hardware-based anamorphic video scaling, in accordance with one embodiment. Representatively, system 200 includes embedded control processor 202 coupled to memory controller 280 and DMA controller 290. In one embodiment, display cluster 270 may include noise correction block 272, H-scaler 210 and a vertical scaler (V-scaler) 274. In one embodiment, motion picture expert group (MPEG) blocks 208 provide video and audio signal processing.

In one embodiment, to provide, for example, compliance with a 30 frame per second bandwidth requirement of display cluster 270, on-chip DMA controller 290 issues DMA requests to on-chip memory controller 280, which provides pixel frames from off-chip system memory 282 to DMA controller 290. The pixel frames are then provided to a first in, first out (FIFO) buffer, for example, as illustrated in FIG. 1. In one embodiment, system 200 may be incorporated within a set-top box or television to provide high-definition television (HDTV) signal processing, as well as within a display pipeline of a digital television (DTV), or the like. In such an embodiment, system memory 282 is provided by the set-top box or television system. In alternative embodiments, PF block 110 may be used to perform video post-processing and/or image enhancement within any device, computer, graphics application, display engine of a graphics controller, graphics chipset or the like.

Operation

Figure 7:
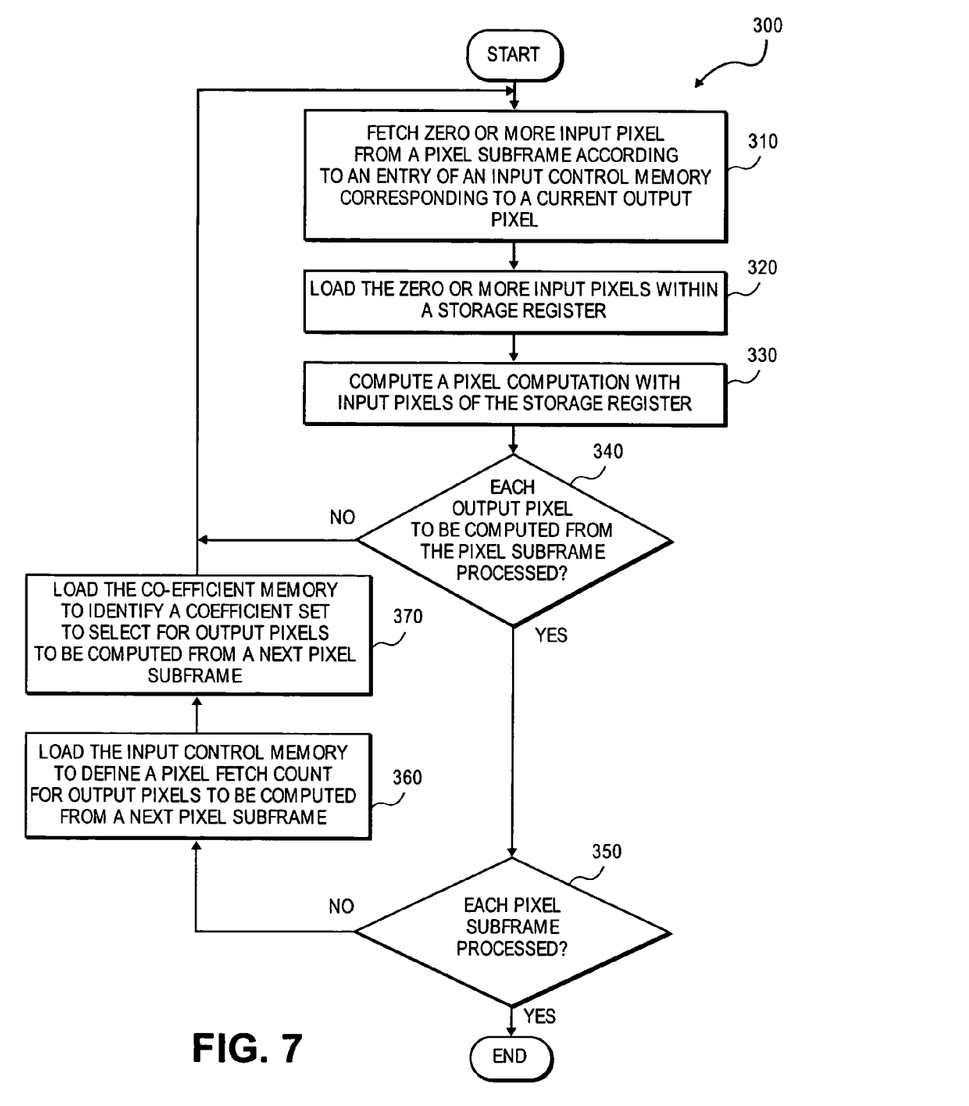
FIG. 7 is a flowchart illustrating a method for anamorphic video scaling, in accordance with one embodiment.

FIG. 7 is a flowchart illustrating a method 300 for performing video scaling within, for example, PF block 110 of FIG. 1, in accordance with one embodiment. At process block 310, zero or more input pixels are fetched from a pixel subframe according to an entry of an input control memory corresponding to a current output pixel. At process block 320, the zero or more input pixels are loaded within an N, entry storage register. Once loaded, at process block 330, a pixel computation is computed with N, input pixels from the storage register and a coefficient set selected according to an entry of the coefficient memory corresponding to the current output pixel.

At process block 340, it is determined whether an output pixel computation has been performed for each output pixel corresponding to the pixel subframe. If the condition of process block 340 is true, control flow branches to process block 350. Otherwise, process blocks 310-330 are repeated until the condition of process 340 evaluates to true. Once process block 360 is reached, processing of output pixels for the pixel subframe is complete. As a result, at process block 360, the input control memory is loaded to define a pixel fetch count for output pixels corresponding to a next pixel subframe. Likewise, at process block 370, the coefficient memory is loaded to identify a coefficient set to select for computation of output pixels corresponding to a next pixel subframe. At process block 350, process blocks 360 and 370, as well as process blocks 310-340 are repeated until each pixel subframe of a pixel frame is processed.

Figure 8:
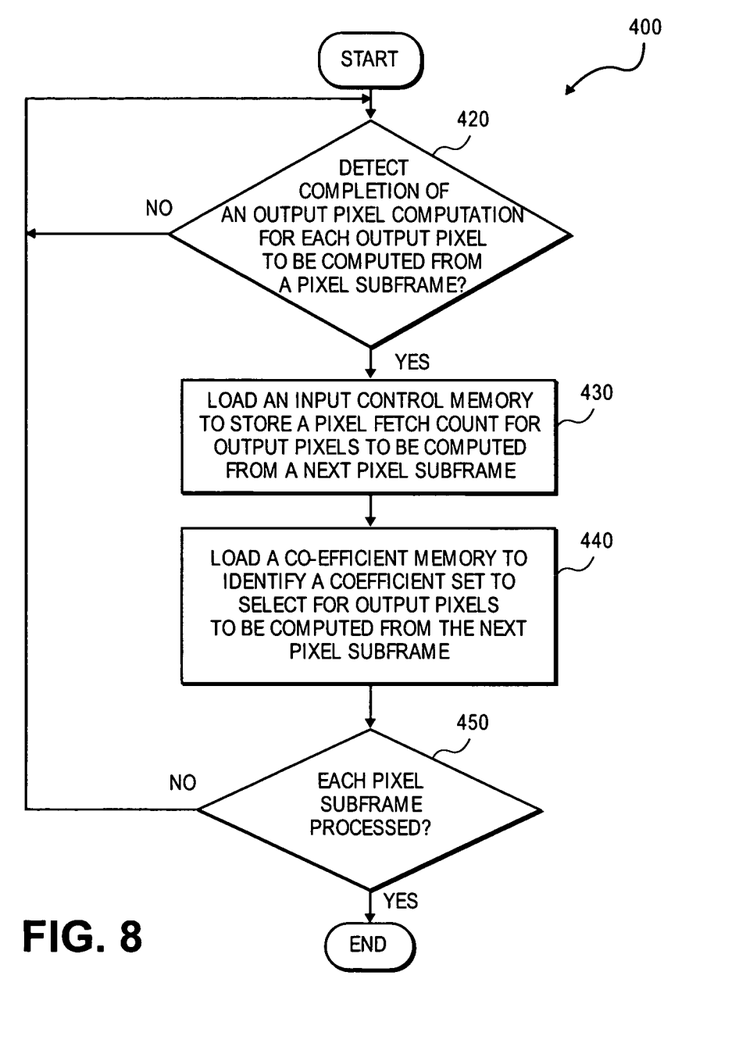
FIG. 8 is a block diagram illustrating a method for populating an input control memory and coefficient set memory to enable anamorphic video scaling, in accordance with one embodiment.

FIG. 8 is a flowchart illustrating a method 400 for populating the input control memories and coefficient memories, for example, as illustrated in FIG. 1, to enable anamorphic video scaling, in accordance with one embodiment. At process block 420, it is determined whether completion of an output pixel computation for each output pixel corresponding to a pixel subframe is detected. In one embodiment, such detection is in response to, for example, an interrupt issued by video-post processing logic, control software or the like. Once detected, at process block 430, an input control memory is loaded to store a pixel fetch count for output pixels corresponding to a next pixel subframe. Likewise, at process block 440, a coefficient memory is loaded to identify a coefficient set to select for computation of output pixels corresponding to the next pixel subframe.

At process block 450, process blocks 420-440 are repeated until each pixel subframe of a pixel frame is processed. In one embodiment, method 400 is performed by, for example, control processor 102 of FIG. 1 (202 FIG. 6). In an alternative embodiment, a device driver, or other control software, may detect completion of output pixel computation for a pixel subframe and either assist the control processor or perform loading of the input control memory and coefficient set memories to enable the anamorphic video scaling computations.

Figure 9:
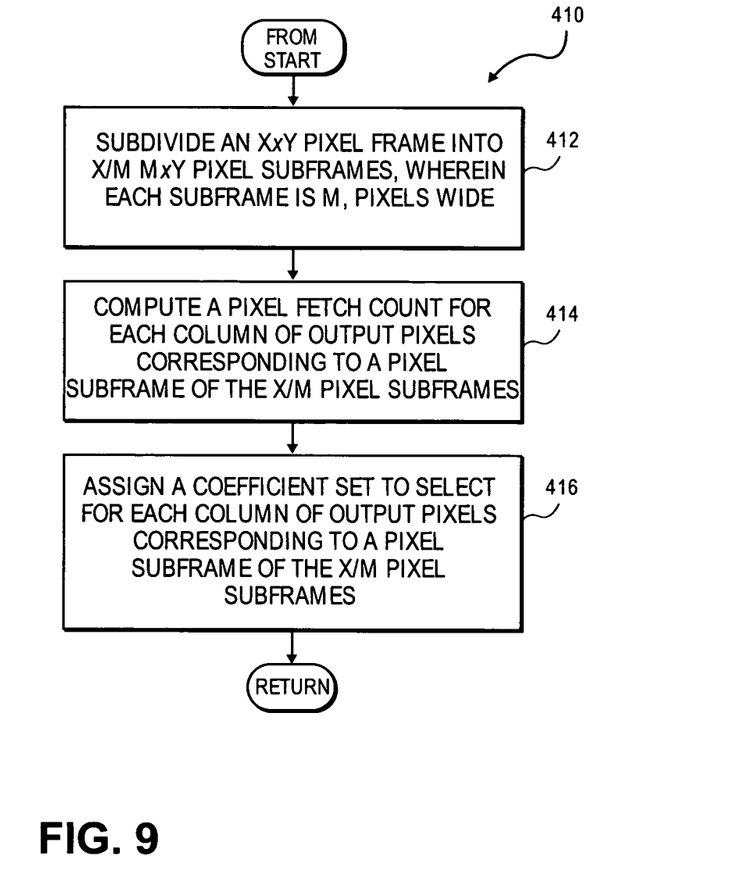
FIG. 9 is a flowchart illustrating a method for subdividing a high definition (HD) pixel frame to enable columnar/stride based access to pixel subframes, in accordance with one embodiment.

FIG. 9 is a flowchart illustrating a method 410 for subdividing a pixel frame to enable anamorphic video scaling, in accordance with one embodiment. At process block 412, an X×Y pixel frame is subdivided into X/M M*X subframe. At process block 414, a pixel fetch count is computed for each column of output pixels corresponding to a pixel subframe of the X/M pixel subframes. At process block 416, a coefficient set is assigned to be selected for each column of output pixels corresponding to a pixel subframe of the X/M pixel subframes. In one embodiment, for example, for a 1920×1080 HD frame, the HD frame is broken up into thirty 64×1080 subframes, as illustrated in FIG. 5.

Accordingly, in one embodiment, calculation of the pixel fetch counts and assigning of coefficient sets to select for each respective output pixel computation may be performed by device drivers or other control software offline. According to such an embodiment, the computed values may be accessed via a DMA controller, as illustrated in FIG. 6. In an alternative embodiment, values to populate for input control memory 120 and coefficient set memory 130 are performed following detection of processing of each respective pixel subframe.

Figure 10:
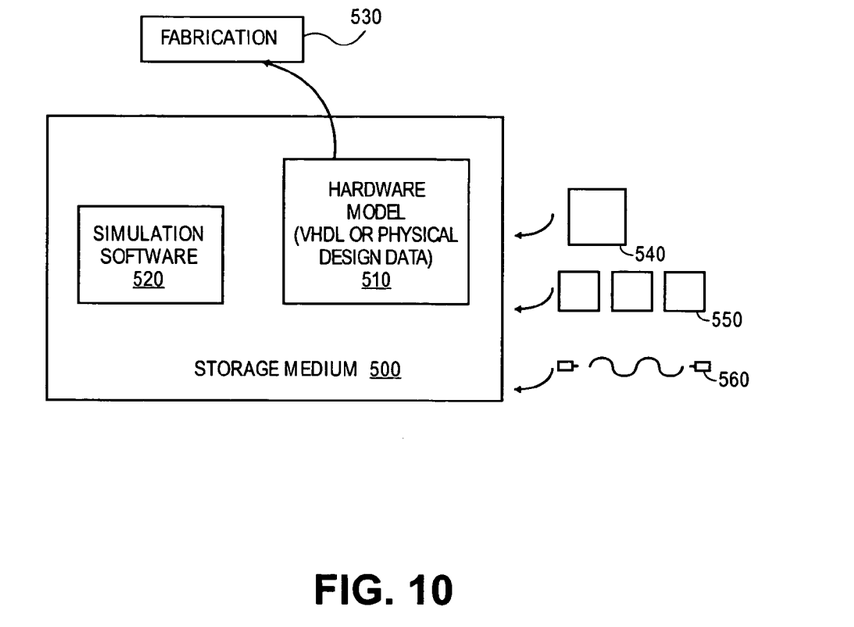
FIG. 10 is a block diagram illustrating various design representations of formats for emulation, simulation and fabrication of a design using the disclosed techniques.

FIG. 10 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 510 may be stored in a storage medium 500, such as a computer memory, so that the model may be simulated using simulation software 520 that applies a particular test suite to the hardware model 510 to determine if it indeed functions as intended. In some embodiments, the simulation software is not recorded, captured or contained in the medium.

In any representation of the design, the data may be stored in any form of a machine readable medium. An optical or electrical wave 560 modulated or otherwise generated to transport such information, a memory 550 or a magnetic or optical storage 540, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternative Embodiments

It will be appreciated that, for other embodiments, a different system configuration may be used. For example, while the system 100 is configured as a system-on-chip, for other embodiments, a single or multiprocessor system (where one or more processors may be similar in configuration and operation to the processor 110 described above) may benefit from the horizontal polyphase filter of various embodiments. Further different type of system or different type of computer system such as, for example, a server, a workstation, a desktop computer system, a gaming system, an embedded computer system, a blade server, etc., may be used for other embodiments.

Having disclosed embodiments and the best mode, modifications and variations may be made to the disclosed embodiments while remaining within the scope of the embodiments of the invention as defined by the following claims.

What is claimed is:

1. A computing system, comprising:
a first storage circuit to store a plurality of entries, said plurality of entries corresponding to a listing of a number of input pixels to fetch in correct sequence order for a particular video scaling operation on a video frame;
a second storage circuit to store sets of coefficient values in correct sequence order for said particular video scaling operation on said video frame, said correct sequence order of said coefficient values being a function of a scaling factor and an output pixel;
a shift register;
controller logic circuitry to repeatedly perform the following to setup a next output pixel value calculation:
linearly increment a prior address value for said first storage circuit to determine a next address value for said first storage circuit;
fetch a next entry from said first storage circuit at said next address value;
fetch a number of pixel values, said next entry used to determine said number of pixel values that are fetched;
enter said fetched pixel values into said shift register;
linearly increment a prior address value for said second storage circuit to determine a next address value for said second storage circuit;
fetch a next set of coefficients from said second storage circuit at said next address value for said second storage circuit;
arithmetic logic circuitry to repeatedly perform the following to calculate a next output pixel value:
perform a mathematical operation with said shift register's contents and next set of coefficients fetched by said controller logic circuitry.

2. The computing system of claim 1 wherein said mathematical operation is a convolution.

3. The computing system of claim 1 wherein said specific scaling operation includes upscaling.

4. The computing system of claim 1 wherein said specific scaling operation includes downscaling.

5. The computing system of claim 1 further comprising a processor that determines said correct sequence order of said entries and determines said correct sequence order of said sets of coefficients.

6. The computing system of claim 5 further comprising a multiplexer through which set entries and sets of coefficients flow prior to being respectively written into said first and second storage circuits.

7. A method, comprising:
for a first scaling operation on a video frame:
calculating a correct sequence order of numbers of pixel values to be fetched for said first scaling operation and storing into a first storage circuit a series of entries corresponding to said numbers of pixel values in said correct sequence order;
calculating a correct sequence order of sets of coefficients for said first scaling operation and storing into a second storage circuit said sets of coefficients in said correct sequence order; and,
repeatedly performing the following to perform said first scaling operation:
linearly incrementing address values of said first and second storage circuits to respectively fetch a respective one of said entries and fetch a next set of coefficients, said respective one of said entries used to determine a next number of pixels to be fetched;
fetching said next number of pixel values and entering them in a shift register;
determining a next output pixel value by performing a mathematical operation that uses said register's contents and said next set of coefficients as input values.

8. The method of claim 7 further comprising:
for a second scaling operation on a second video frame that is different than said first scaling operation:
calculating a correct sequence order of numbers of pixel values to be fetched for said second scaling operation and storing into said first storage circuit a series of entries corresponding to said numbers of pixel values in said correct sequence order;

calculating a correct sequence order of sets of coefficients for said second scaling operation and storing into said second storage circuit said sets of coefficients in said correct sequence order; and, to perform said second scaling operation, repeatedly performing the following with same hardware used to perform correspondingly same operations for said first scaling operation:

linearly incrementing address values of said first and second storage circuits to respectively determine a next number of pixels to be fetched and a next set of coefficients;

fetching said next number of pixel values and entering them in a shift register;

determining a next output pixel value performing a mathematical operation that uses said register's contents and said next set of coefficients as input values.

9. The method of claim 7 wherein said first scaling operation includes an upscaling operation.

10. The method of claim 9 wherein said upscaling operation includes a vertical upscaling operation.

11. The method of claim 9 wherein said upscaling operation includes a horizontal upscaling operation.

12. The method of claim 7 wherein said first scaling operation includes a downscaling operation.

13. The method of claim 12 wherein said downscaling operation includes a vertical downscaling operation.

14. The method of claim 12 wherein said downscaling operation includes a horizontal downscaling operation.

15. A computing system, comprising:

a plurality of processors;

a first storage circuit to store a plurality of entries, said plurality of entries corresponding to a listing of a number of input pixels to fetch in correct sequence order for a particular video scaling operation on a video frame;

a second storage circuit to store sets of coefficient values in correct sequence order for said particular video scaling operation on said video frame, said correct sequence order of said coefficient values being a function of a scaling factor and an output pixel;

a shift register;

controller logic circuitry to repeatedly perform the following to setup a next output pixel value calculation:

linearly increment a prior address value for said first storage circuit to determine a next address value for said first storage circuit;

fetch a next entry from said first storage circuit at said next address value;

fetch a number of pixel values, said next entry used to determine said number of pixel values that are fetched;

enter said fetched pixel values into said shift register;

linearly increment a prior address value for said second storage circuit to determine a next address value for said second storage circuit;

fetch a next set of coefficients from said second storage circuit at said next address value for said second storage circuit;

arithmetic logic circuitry to repeatedly perform the following to calculate a next output pixel value:

perform a mathematical operation with said shift register's contents and next set of coefficients fetched by said controller logic circuitry.

16. The computing system of claim 15 wherein said mathematical operation is a convolution.

17. The computing system of claim 15 wherein said specific scaling operation includes upscaling.

18. The computing system of claim 15 wherein said specific scaling operation includes downscaling.

19. The computing system of claim 15 wherein one of said processors determines said correct sequence order of said entries and determines said correct sequence order of said sets of coefficients.

20. The computing system of claim 19 further comprising a multiplexer through which set entries and sets of coefficients flow prior to being respectively written into said first and second storage circuits.

* * * * *